United States Patent [19]

Siegel

[11] 4,135,366
[45] Jan. 23, 1979

[54] VALVELESS DIFFERENTIAL TEMPERATURE ENGINE

[76] Inventor: Israel Siegel, 351 W. 71 St., New York, N.Y. 10023

[21] Appl. No.: 710,787

[22] Filed: Aug. 2, 1976

[51] Int. Cl.² .............................................. F03G 7/02
[52] U.S. Cl. ...................................... 60/497; 60/641; 60/531; 137/251
[58] Field of Search ........................ 60/531, 497–507, 60/641; 137/251

[56] References Cited

U.S. PATENT DOCUMENTS

| 655,623 | 8/1900 | Harriman | 137/251 X |
| 1,437,138 | 11/1922 | Gray | 137/251 |

Primary Examiner—Allen M. Ostrager

[57] ABSTRACT

The invention describes a valveless and practically frictionless differential temperature engine. The engine consists of a relatively warm evaporator chamber and a relatively cold condensor chamber containing a low boiling point fluid. The temperature differential between the chambers results in a corresponding vapor pressure differential between the chambers. Changes in the vapor pressure differential between the chambers causes liquid to rise and fill in a tube communicating between the liquid phase of the evaporator chamber and the vapor phase of the condensor chamber. The movement of the liquid is transmitted to a float and to a force receiving component outside of the chambers. The changes in the vapor differential between the chambers are automatically cyclically regulated by the level of liquid in the evaporator chamber which alternately submerges and uncovers the lower open end of a slanted tube communicating between the vapor phases of the chambers.

14 Claims, 5 Drawing Figures

VALVELESS DIFFERENTIAL TEMPERATURE ENGINE

BACKGROUND

The invention relates to engines adapted to the conversion of solar thermal energy to mechanical and electrical energy and in particular to improvements in differential temperature engines previously described by the author in U.S.A. Pat. Nos. 3,841,097 and 3,846,984.

Solar energy is available in practically unlimited quantities, it is free, and continuously renewable. Despite its potential, solar energy has not served as a significal source of mechanical and electric energy. This has been caused by the high capital investment and amortization rates of components of the systems required for the conversion of solar thermal energy to mechanical and electric energy. This has reduced the ability of solar energy to compete with alternate energy source such as conventional fuels.

Differential temperature engines are ideally suited for the solar conversion systems because of their sensitivity and relatively efficient operations at low temperatures. Essentially a differential temperature engine consists of a relatively warm and a relatively cold chamber containing a low boiling point fluid. Alternate opening and closing of a communication between the vapor phases of the warm and cold chambers results in changes in vapor pressure in the chambers. The vapor pressure changes are translated to useful work through a moving member which responds to changes in the vapor pressure. The differential temperature engine, like most heat engines, requires a regulated valve system between the high pressure and low pressure portions of the engine. This constitutes a relatively expensive component of the engine. The present invention consists of a differential temperature engine which operates without a valve system or with minimal number of valves. In addition the engine operates through a float without close fitting moving components, a fact which greatly reduces wear and tear due to friction.

Another unique feature of the valveless differential temperature engine is the fact that it can utilize flat plate collector systems and storage tanks of the type available in standard solar hot water systems. Thus, a roof solar hot water system can be utilized not only for heating a home water supply but also for activation of air conditioner compressors and generation of electric power.

SUMMARY

The valveless differential temperature engine consists of two sealed interconnected relatively warm and relatively cold chambers containing a low boiling point fluid. Two conduits or tubes communicate with the condensor chamber and are immersed at their open end in the liquid in the warm chamber. One tube is immersed vertically in the liquid and the other tube is immersed obliquely in the liquid. The degree of immersion of the open end of the oblique tube in the liquid phase of the evaporator chamber is less than that of the vertical tube, and is determined by the operational levels of the liquid in the evaporator chamber, i.e. the immersion is complete when the operational level of the liquid in the evaporator chamber is high, and the immersion is incomplete when the operational level of the liquid in the evaporator chamber is low. The complete immersion of the lower open end of the oblique tube completes the separation between the vapor phase of the evaporator and condensor chambers. In contrast, the incomplete immersion of the lower open end of the oblique tube allows a communication between the vapor phases of the chambers.

When the liquid level in the evaporator chamber is operationally high the vapor pressure differential between the chambers causes liquid level to rise in the vertical and oblique tubes and to fall in the evaporator chamber. When the liquid level in the evaporator chamber falls to below the level of the immersed open end of the oblique tube, vapor is transferred from the evaporator to the condensor chamber through the oblique tube. This diminishes the vapor pressure differential between the chambers and causes liquid which has risen in the tubes to flow back to the evaporator chamber. This raises the liquid level in the evaporator chamber and reimmerses the open end of the oblique tube to renew the cycle of operation. The vapor which has entered the condensor chamber condenses and returns to the evaporator chamber by gravity or by a pump. Changes in the levels of the liquid is translated to useful work through at least one float which responds to the changes in the liquid levels.

In one embodiment of the engine the vertical tube is omitted and a float responding to the liquid levels is present in the oblique tube. In another form of the invention a steam engine utilizes a similar oblique tube to obtain intermittant communication of a boiler with the outside air. Means to induce temperature differential include selective warming of one chamber by solar collector systems and selective cooling of the condensor chamber by surface evaporation of water or by selective immersion of one chamber in a natural body of water.

In FIGS. 1-5 similar parts have similar numbers.

DETAILED DESCRIPTION

Figure 1:
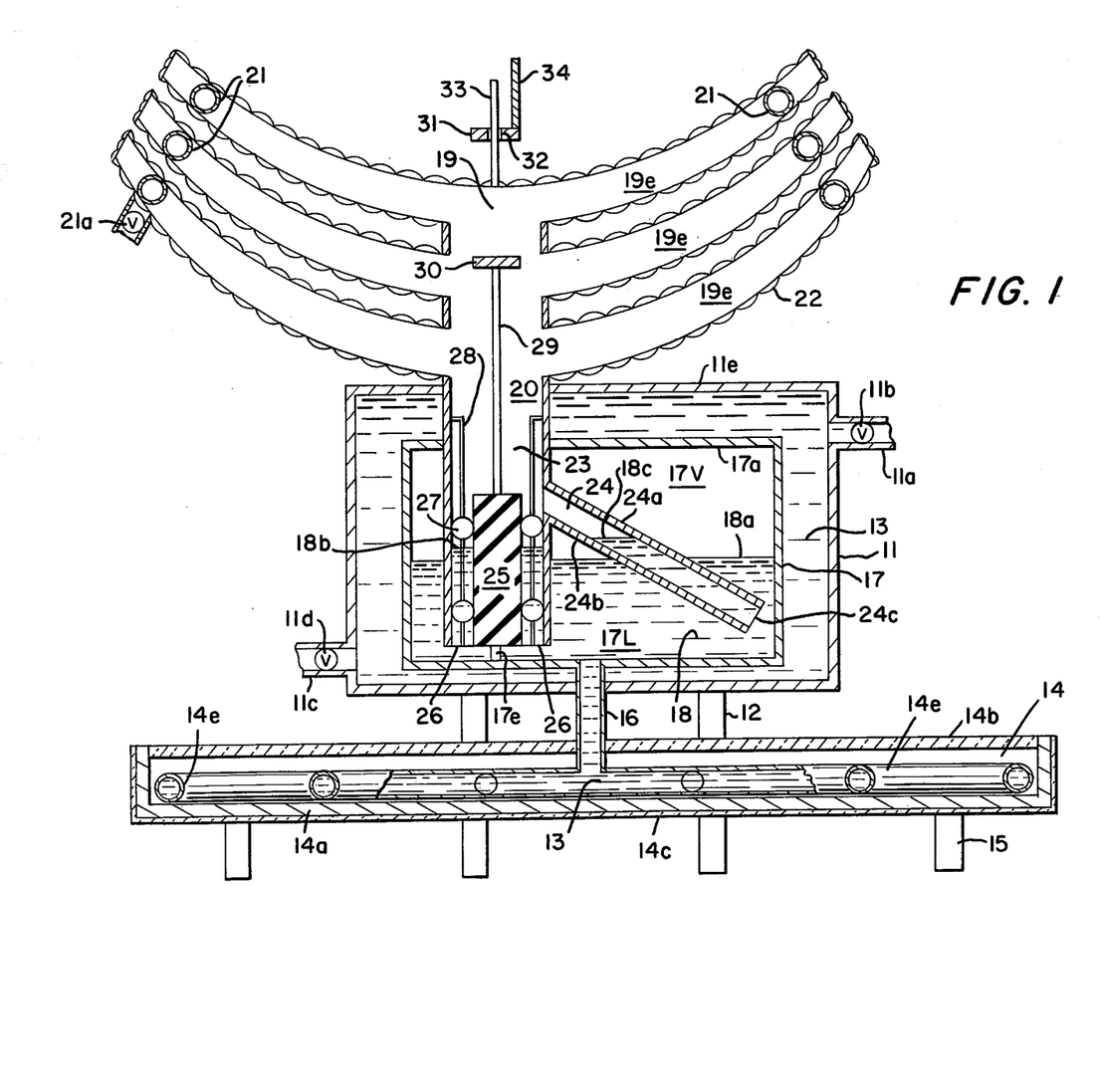
FIG. 1 is a cross sectional view of a valveless differential temperature engine which utilizes flat plate collector and storage tanks of solar hot water systems.

Referring to the drawing there is shown in FIG. 1 a valveless differential temperature engine embodying the present invention. The engine utilizes flat plate collectors and water storage tanks of solar hot water systems. As shown, a water tank 11 is supported by legs 12. The tank is adapted to store water 13. Present below water tank 11 is a solar flat plate collector 14 which rests on legs 15. The flat plate solar collector consists of an aluminium shallow plate or pan 14a. The surface of pan 14a is painted black and is covered by a transparent glass or plastic 14b. The pan 14a and cover 14b define a shallow compartment 14c which is closed from outside air. The back and sides of pan 14a are covered by a heat insulating layer 14c. Present inside compartment 14c between the transparent cover 14b and the black surface of the pan 14a are interconnected pipes 14e containing water 13. The pipes communicate through pipe 16 with water 13 in tank 11. The arrangement is that the solar flat plate collector is tilted and faces South to absorb a maximal amount of solar energy. Solar thermal energy in the form of shortwave radiation pass through the glass cover 14b and strikes plate 14a. The plate 14a absorbs most of the shortwave radiation and re-radiates it as longwave radiation. Since the transparent cover 14b is virtually opaque to the longwave radiation heat accumulates in compartment 14c and heats pipes 14e and inside water 13. The water in flat plate collector 14 diffuses to tank 11 through pipe 16. The tank 11 and flat plate collector 14 may constitute components of a standard roof solar hot water supply system. To that end inlet 11a and valve 11b connect water in tank 11 with a central water supply and outlet 11c and valve 11d connect water in tank 11 with the home water supply.

Immersed in water 13 inside of tank 11 is chamber 17. Chamber 17 functions as an evaporator as will be hereinafter described. The chamber 17 contains a low boiling point liquid 18. The liquid 18 defines a liquid level 18a and divides evaporator chamber 17 into a liquid chamber portion 17L and a vapor chamber portion 17V.

Present above evaporator chamber and supported by tube 20 is a chamber 19. Chamber 19 is adapted to serve as a condenser chamber as will be described. The condensor chamber 19 is divided into leaf or petal shaped compartments 19e. The inside of all the compartments 19e of chamber 19 communicate with the tube 20. The spacings between the compartments 19e are designed to allow for maximal contact of the outer surfaces of the compartments with ambient air. The walls of chamber 19 and compartments 19e are made of good heat conducting material, such as copper or aluminium to allow for maximal transfer of heat from chamber 19 to ambient air. Present on top of each compartment 19e is a water pipe 21. The pipes 21 are connected to an outside water source (not shown) to distribute water upon the outside surfaces of the compartment 19e. The outside surfaces of the compartments 19e are covered by a wick-like material 22 to help spread the water upon the outside surfaces by capillary action. The flow of water from pipes 21 to surfaces of compartment 19e may be controlled manually by valve 21a. Tube 20 forms a communication between condensor chamber 19 and evaporator chamber 17. The arrangement is that tube 20 penetrates the lower portion of condensor chamber 19. The insides of compartment 19e communicate with the inside of tube 20. The walls of the compartments 19e form an angle which is less than 180° with the wall of tube 20 so that all liquids in chamber 19 and its compartments 19e will drain by gravity into tube 20. As tube 20 leaves condensor chamber 19 to enter evaporator chamber 17 it passes through the upper walls 11e and 17a of tank 11 and evaporator chamber 17 respectively. The tube 20 forms a tight fit with the penetrated walls to prevent leakage. Proper sealing materials may be used. As tube 20 enters chamber 17 it divides into tube branches 23 and 24. Tube 23 functions as a power tube, and tube 24 as a seal control as will be described. The lower open ends of tubes 23 and 24 dip in the liquid 18 to define a liquid level 18b and 18c in tubes 23 and 24 respectively. The tube 23 is vertical and extends deeper into the liquid 18 than tube branch 24. Branch tube 24 is slanted and its lower side wall 24b is longer than its upper side wall 24a. This defines a gap 24c between the bottom walls of tube 24. The angle of branch tube 24 with tube 20, the diameters of branch tubes 23 and 24, and the level of liquid 18 in chamber 17 are adjusted for the efficient operation of the seal control tube 24 as will be hereinafter described.

Present inside branch tube 23 is a float 25. When the float 25 is in its lowest position it rests upon extension 17e of bottom wall of chamber 17. The float defines interspace 26 between the walls of float 25 and tube 23 so as to allow for a vertical movement of the float 25 in the tube 23. Suitable guide means are provided for maintaining the position of the float 25 relative to branch tube 23. The guide means may comprise guide rings 27 connected to the side walls of float 25 to ride along guiding rods 28, connected to the side wall of tube 23.

Connected to the upper outside wall of float 25 is rod 29. Rod 29 extends upwards and is connected to magnet 30 so that movement of rod 29 is transmitted to magnet 30. Another magnet 31 is present outside and above container 19. The magnet 31 has a central hole 32. Rod 33 extends upwards from upper wall 19a of container 19 and is inserted into the central hole 32 of magnet 31. The rod 33 allows the magnet to move vertically but restricts the magnet from moving horizontally. The positions of the magnet are such that the polarity of the upper surface of magnet 30 is of same polarity as lower surface of magnet 31. When magnet 30 moves upward and approaches magnet 31, magnet 31 is repelled by the like magnetic forces of magnet 30 and magnet 31 moves upward. When magnet 30 moves downward magnet 31 will slide downward through the force of gravity. Connected to the upper wall portion of magnet 31 is a force transmitting rod 34. The rod 34 in connected through conventional mechanical linkages (not shown) to work producing means such as a compressor of an air conditioning system, or the moving part of a generator.

The operation of the automatic low temperature engine illustrated in FIG. 1 is as follows. Water 13 in tank 11 is heated by solar thermal energy trapped in the flat plate 14. The heat in water 13 is transferred to immersed evaporator chamber 17. In a sunny day this can result in a rise in the temperature in the evaporator chamber of 20°–40° C. In contrast, water evaporates from the surface of condensor chamber 19 and cools the condensor 3–7° C. below ambient temperature. This results in a temperature differential between evaporator chamber 17 and condensor chamber 19. The temperature differential between the chambers induces a vapor pressure differential i.e. the vapor pressure in the evaporator chamber 17 will be larger than the vapor pressure in the condensor chamber 19. The vapor will exert a pressure upon walls of chambers 17 and 19 and upon liquid surfaces 18a, 18b, and 18c, in chamber 17, tube 23, and tube 24 respectively. Since the vapors in tubes 23 and 24 communicate with the vapors in the condensor chamber 19 the vapor pressure upon liquid surfaces 18b and 18c in the tubes will be equal to the relatively low vapor pressure in the condensor chamber. In contrast, the vapor pressure upon liquid surface 18a in the evaoorator chamber will be equal to the relatively high vapor pressure in the evaporator chamber. This raises the fluid levels 18b and 18c in tubes 23 and 24 and lowers the fluid level 18a in chamber 17. As the fluid level 18a is decreased it eventually reaches a level which causes a partial exposure of gap 24c to the vapor phase 17V of chamber 17. When this occurs a communication between tube 24 and the vapor phase 17V is established. This will cause vapor to leave evaporator chamber 17 and enter condensor chamber 19 through tube 24. The vapor differential between the evaporator and the condensor which caused fluid level in tubes 23 and 24 to rise will thus be diminished. This will cause the liquid which has entered tubes 23 and 24 from chamber 17 to flow back to the chamber 17 and to restore the original fluid level 18a in the chamber. When this occurs the gap 24c of tube 24 will be submerged by fluid 18. This will reestablish the separation between the vapor phases of the evaporator chamber 17 and condensor chamber 19 and will renew the cycle of operation. The amount of liquid in chamber 17 must be regulated so that gap 24c is exposed to the vapor phase in chamber 17 (and communication between vapor phases of condensor and evaporator is established) before liquid in tube 23 reaches the junction of tubes 23 and 24. This will be affected by the cross sectional areas of evaporator chamber 17 and tubes 23 and 24 and the angle between tube 24 and fluid surface 18a.

The cyclic changes in fluid levels in tube 24 cause similar changes in the vertical positions of float 25. The up and down movement of the float is transmitted to magnets 30 through rod 29. The upward movement of magnet 30 repulses magnet 31 and causes magnet 31 to move upward. When magnet 30 moves downward magnet 31 will move downward by force of gravity. The movement of magnet 31 is transmitted through rod 34 and conventional linkages to useful work producing means such as a moving portion of a generator or a compressor of air conditioning system.

It is understood that additional floats in tubes 24 and chamber 17 responding to changes in fluid levels in the tube and chamber may be utilized without departing from the essential features of the invention. In addition, non-magnetic means to transmit mechanical energy by direct linkage to work producing means outside of the chambers may be utilized.

Figure 2:
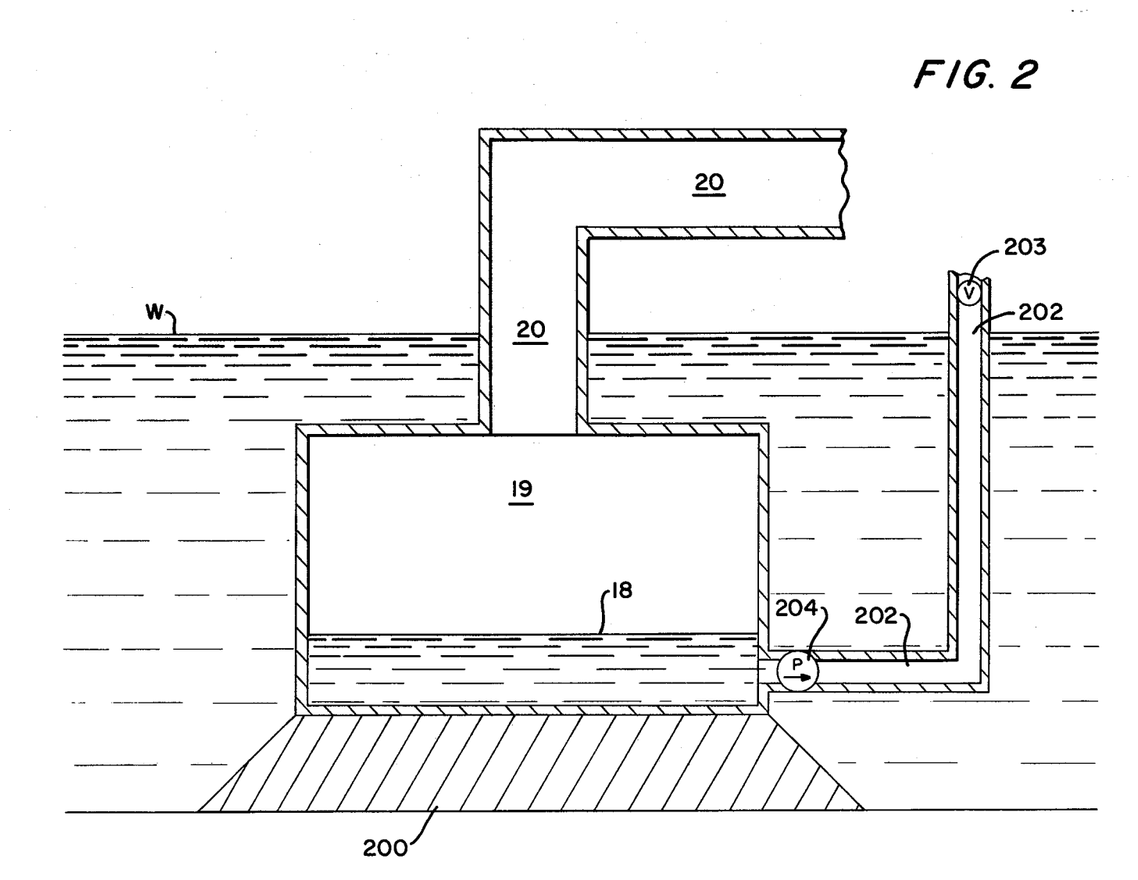
FIG. 2 is a cross sectional view of a modified form of the condensor chamber of the engine adapted to be cooled by a natural body of water.

FIG. 2 illustrates a modification of the condensor chamber 19 in which the condensor chamber is adapted to be cooled by a natural body of water such as a pond, lake, river, or an ocean. The condensor chamber 19 may be paired with an evaporator chamber (not shown) of the type described in FIG. 1. Thus, as shown a base 200 supports a condensor chamber 19 inside a body of water W. The chamber 19 is completely immersed in the body of water W. Tube 20 communicates between the upper vapor portion of the condensor chamber 19 with the paired evaporator chamber. Tube 202 communicates between the bottom portions of condensor chamber 19 and the fluid phase of the paired evaporator chamber. One way valve 203 allows movement of fluid or vapor from condensor chamber 19 but not to the condensor chamber 19. Pump 204 pumps liquid 18 present in the bottom of the condensor chamber 19 to the evaporator chamber.

The operation of the engine with the cold chamber illustrated in FIG. 2 is exactly as described in FIG. 1, except that condensor chamber 19 is cooled by the natural body of water W. The vapor which condenses in condensor chamber 19 accumulates in the lower portion of condensor chamber 19 and is returned by pump 204 and pipe 202 in the evaporator chamber.

Figure 3:
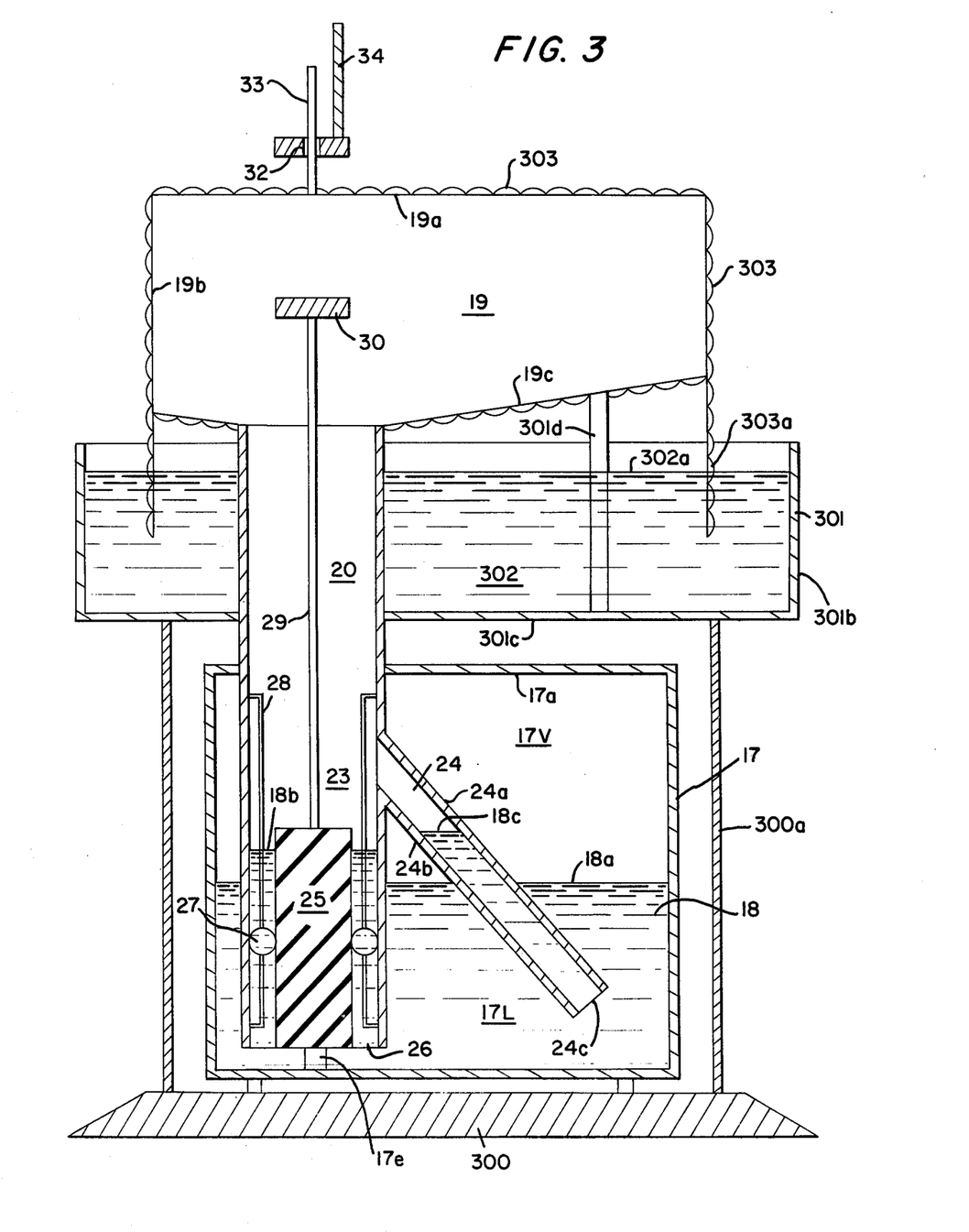
FIG. 3 is a cross sectional view of a modified form of the engine adapted to extract thermal energy from air.

FIG. 3 represents another form of the invention adapted to function during both the presence and absence of direct solar radiations. It has a relatively low energy output and is best suited for production of movement of relatively small objects such as mechanical toys. As shown in FIG. 3, a base or support 300 is provided for supporting the evaporating chamber 17. The chamber contains the low boiling point liquid 18 defining a liquid level 18a and dividing chamber 17 into a liquid chamber portion 17L and a vapor chamber portion 17V. Situated above container 17, and suitably supported by base extensions 300a is a tray 301. The tray is defined by side walls 301b and bottom wall 301c. Present inside tray 301 is water 302 which defines a water level 302a in the tray.

Present above water level 302a and supported by extensions 301d of lower walls 301c of tray 301 is a condensor chamber 19. The chamber 19 is defined by upper wall 19a, sidewalls 19b, and lower wall 19c. All the surfaces of the chamber 19 are covered by a thin layer of wick material 303. The purpose of the wick is to draw water 302 by capillary action from tray 301 to the surfaces of condensor chamber 19. To achieve this, wick extension 303a dips into water 302.

Tube 20 forms a communication between the evaporator chamber 17 and the condensor chamber 19. As illustrated in FIG. 3 conduit 20 passes through bottom wall 19c of condensor chamber 19, bottom wall 301c of tray 301, and top wall 17a of container 17. The conduit 20 forms a tight fit with all the penetrated walls 19C, 301c, and 17a to prevent leakage. A proper sealant material between the tube 20 and the penetrated walls may be used. As illustrated, the walls of tube 20 are continuous with bottom wall 19c of condensor chamber 19. The angle between wall 19c and outside wall of tube 20 is larger than 90° so that any liquid in chamber 19 will flow to tube 20 by force of gravity. All other parts of the engine in FIG. 3 are similar to those described in FIG. 1, except that tank 11, and flat plate collector 14 and associated supports 16 and 15 have been ommitted. Thus, as tube 20 enters chamber 17, it divides into tube branches 23 and 24. Tube 23 functions as a power tube, and tube 24 as a seal control. The lower ends of tubes 23 and 24 dip in the liquid 18. Power tube 23 is vertical and extends deeper into the liquid 18 than tube branch 24. Branch tube 24 is slanted and its lower side wall 24b is longer than its upper side wall 24a. This defines a gap 24c between the walls of tube 24.

Present inside branch tube 23 is a float 25. When the float 25 is in its lowest position it rests upon base extension 17e of lower wall of chamber 17. The float defines an interspace 26 between the walls of float 25 and tube 23 so as to allow for vertical movement of the float 25 in the tube 23. Suitable guide means are provided for maintaining the position of the float 25 relative to branch tube 23. The guide means may comprise guide rings 27 connected to the side walls of float 25 to ride along guide rods 28 connected to the side wall of tube 23.

Connected to the upper outside surface of float 25 is rod 29. Rod 29 extends upwards and is connected to magnet 30 so that movement of rod 29 is transmitted to magnet 30. Another magnet 31 is present above container 19. The magnet 31 has a central hole 32. Rod 33 extends upwards from upper wall 19a of container 19 and is inserted into central hole 32 of magnet 31. The magnet can move freely vertically but is restricted from moving horizontally. The magnets are positioned so that upper surface of magnet 30 is of the same polarity as lower surface of magnet 31. When magnet 30 moves upward and approaches magnet 31, magnet 31 is repelled by the magnetic forces of magnet 30 and magnet 31 moves upward. When magnet 30 moves downward magnet 31 will move downward through the force of gravity. Connected to the upper wall portion of magnet 31 is a force transmitting rod 34 which is connected through conventional linkages (not shown) to moving portion of small objects such as toy vehicles, animated dolls, etc.

The operation of the engine is as follows, wick extensions 303a dips into water 302 in tray 301. The water rises by capillary action and wets wick 303 and surfaces of condensor chamber 19. The evaporation of water from surfaces of condensor chamber 19 cools the condensor chamber to below ambient temperature. In contrast, evaporator chamber is kept at ambient temperature by ambient air. This creates a small temperature differential between the condensor chamber 19 and evaporator chamber 17. This results in the mechanical movement of magnet 31 and force transmitting rod 34 exactly as described in FIG. 1. The movement may be translated through conventional linkage to movement of a small toy vehicle such as a toy car or through movement of parts of an animated small doll, etc.

It is understood that other means may be used for obtaining a small temperature differential to activate the valveless differential temperature engine. This includes warming of the evaporator chamber by natural body heat. This may be used for small objects which naturally involve body contact such as toy dolls, contact jewelry, pacemakers, etc.

Figure 4:
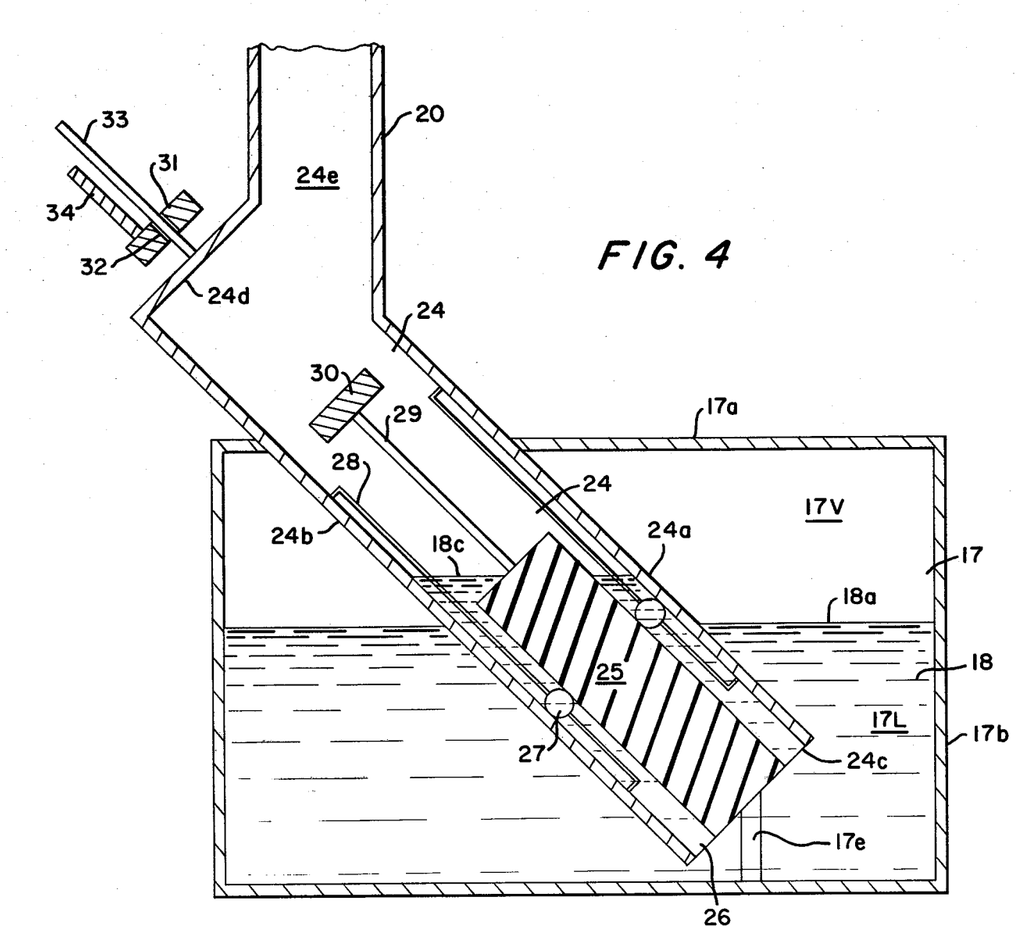
FIG. 4 is a cross sectional view of a modified version of the evaporator chamber.

FIG. 4 represents a modification of the evaporation chamber 17 in which one tube serves as both power tube and seal control tube. The modified evaporator chamber is paired with a condensor chamber (not shown) of a type described in FIGS. 1, 2 or 3. As shown, an evaporator chamber 17 is defined by top wall 17a, side walls 17b and bottom wall 17c. The chamber 17 contains a low boiling point fluid 18 defining a fluid level 18a in chamber 17, and dividing chamber 17 in a chamber liquid portion 17L and a vapor liquid portion 17V. Tube 24 is slanted and enters chamber 17 through upper wall 17a of chamber 17. The tube 24 extends downward to dip in fluid 18 and to define a liquid level 18c in tube 24. The tube 24 forms a tight fit with wall 17a to prevent leakage of vapor from chamber 17. As illustrated, tube 24 is defined by side walls 24a and 24b and upper corner wall 24d. The wall 24d forms a 90° angle with side wall 24b. An upper gap 24e between walls 24a and 24d serves as an opening between tubes 24 and 20. Tube 20 is present above tube 24 and forms a communication between a condensor chamber (not shown) and tube 24. The side wall 24a of tube 24 is shorter than the side wall 24b to form a gap 24c between the lower walls of tube 24.

Present inside tube 24 is float 25. When the float is in its lowest position, it rests upon extension 17e of bottom wall 17c of chamber 17. The float defines an interspace 26 between the walls of float 25 and tube 24 so as to allow for the movement of float 25 in tube 24. Suitable guide means are provided for maintaining the position of float 25 relative to branch tube 24. The guide means may comprise guide ring 27 connected to the side walls of float 25 to ride along guide rods 28 connected to the side walls of tube 24.

Connected to the upper outside wall of float 25 is rod 29. Rod 29 is parallel to slanted walls of 24a and 24b of tube 24. Magnet 30 is connected to the upper end of rod 29 so that movement of rod 29 is transmitted to magnet 30. The magnet 30 is parallel to wall 24d of tube 24. Another magnet 31 is present outside of container 19 above wall 24d. The magnet 31 has a central hole 32. Rod 33 forms a 90° angle with wall 24d outside of tube 24. Rod 33 is inserted into hole 32 of magnet 31. The arrangement is such that magnet 31 is parallel to wall 24d and is exactly opposite magnet 30. The upper surface of magnet 30 is of the same polarity as the lower parallel surface of magnet 31. When magnet 30 moves upward it repels magnet 31 and causes it to move upward along rod 33. When magnet 30 moves downward magnet 31 returns to its lower position by force of gravity. Connected to the upper surface of magnet 31 is a force transmitting rod 34. The rod 34 is connected through conventional mechanical linkages (not shown) to work producing means.

The operation of the evaporator chamber is similar to the engine described in FIGS. 1-3, except that liquid rises in tube 24 only instead of rising in 23 and 24. Thus, upon the development of a pressure differential between the liquid surfaces 18a and 18b in chamber 17 and tube 24, respectively, the liquid rises in tube 24. This causes float 25 to move obliquely upward along tube 24. The movement is transmitted to magnet 30 through rod 29. The upward oblique movement of magnet 30 will cause a corresponding movement of magnet 31 through repulsive magnetic forces.

As liquid leaves chamber 17 and enters tube 24 the fluid level 18a in chamber 17 is lowered. When the fluid in chamber 17 reaches a level which is below the gap 24c of tube 24, a communication between vapor phases 17V and the paired condensor chamber through tube 24 is established. This will cause vapor to leave evaporator chamber 17 through tube 24. When this happens the vapor differential which has caused liquid to rise in tube 24 will be diminished. This will cause fluid to return from tube 24 to chamber 17. The returning fluid will raise the level 18a of liquid 18 and will cause gap 24c of tube 24 to be covered by the fluid 18. This will cause a separation between the vapor phases of the condensor and evaporator chambers and will renew the cycle of operation.

The changes in fluid levels in tube 24 will cause a corresponding change in the position of float 25. The movement of float 25 will be transmitted to magnet 30 through rod 29. As magnet 30 moves obliquely upward and approaches magnet 31 it repels magnet 31 and causes the magnet 31 to move obliquely upward along axis 33. When magnet 30 moves downward magnet 31 slides downward by force of gravity. The movement of magnet 31 is translated to useful work by conventional linkage to force transmitting rod 34.

Figure 5:
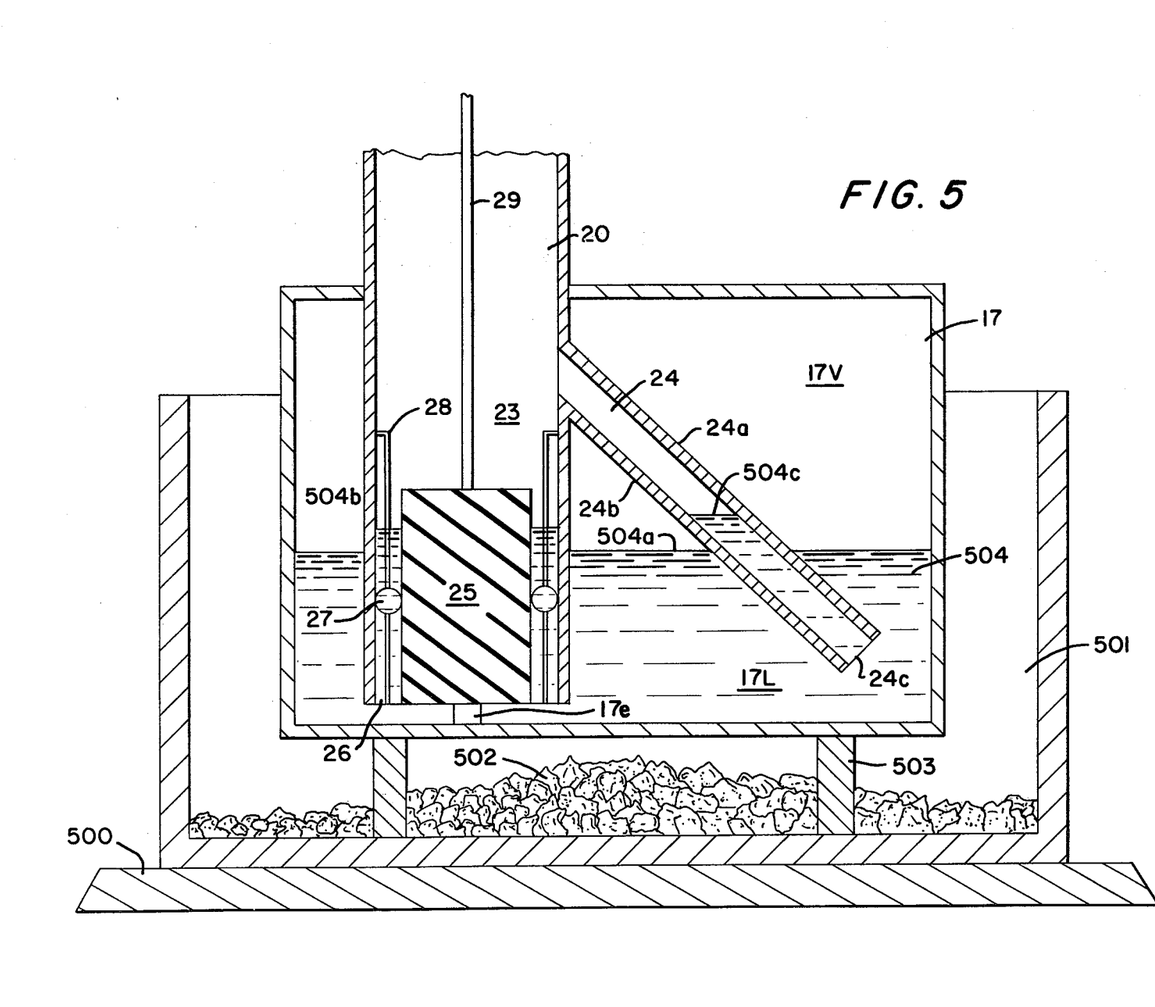
FIG. 5 is a cross sectional view of the engine adapted to function as a valveless steam engine.

FIG. 5 represents a modified form of the invention adapted to function as a valveless steam engine powered by conventional fuel. To that end, the condensor chamber has been omitted and the evaporator chamber communicates directly with the atmosphere. As shown, a support 500 is provided for supporting a container 501. Container 501 is adapted to contain and to burn conventional fuels such as coal, wood, or oil 502. Present inside container 501 and supported by extension 503 of lower wall of container 501 is evaporator chamber 17. The chamber 17 contains water 504. The water 504 defines a water level 504a in chamber 17 and divides chamber 17 into a liquid chamber portion 17L and vapor chamber 17V. Penetrating chamber 17 through its upper wall 17a is tube 20. The tube 20 forms a tight fit with the penetrated wall to prevent leakage of vapor from chamber 17. A proper sealant may be used. The tube 20 divides into tube branches 23 and 24. The branches extend into the liquid chamber portion 17L and dip into water 504. The water in tubes 23 and 24 defines a water level 504b and 504c respectively. Vertical tube 23 extends deeper into the liquid chamber portion 17L than slanted tube 24. The upper slanted wall 24a is shorter than the bottom slented wall 24b of tube 24 to define a gap 24c between the bottom walls of tube 24. When gap 24c is open the vapor phase of the evaporator chamber 17 communicates directly with the ambient air. When gap 24c is covered with the liquid 504 the vapor phase in chamber 17 is sealed from the outside air.

Present inside tube 23 is a float 25. When the float 25 is in its lowest position it rests upon base extension 17e of lower wall of chamber 17. The float 25 defines an interspace 26 between the walls of float 25 and tube 23 so as to allow for the vertical movement of the float inside the tube. Suitable guide means are provided for maintaining the position of the float 25 relative to tube 23. The guide means may comprise guide rings 27 connected to side walls of float 25 to ride along guide rods 28 connected to inner side walls of tube 23. Connected to the upper wall portion of float 20 is a force transmitting rod 29. Rod 29 is connected through conventional mechanical linkages (not shown) to work producing means such as a generator or wheels of a machine or vehicle.

The operation of the valveless team engine is as follow, Fuel 502 burns and heats evaporator chamber 17. Water 504 evaporates in chamber 17 and the vapor exerts a pressure on walls of container 17 and water surface 504a. The water likewise evaporates in tubes 23 and 24. In contrast to the vapor in chamber 17, the vapors in the tubes 23 and 24 escape to the outside atmosphere through upper tube 20. This causes the vapor pressure on surface 504a in chamber 17 to be larger than the vapor pressure upon surface 504b and 504c in tubes 23 and 24. This will raise the water levels 504b and 504c in tubes 23 and 24 and lower the water level 504a in chamber 17. When the water level 504a descends to below the level of gap 24c of tube 24c of tube 24 the vapor which has accumulated in chamber 17 will escape to the outside atmosphere through tubes 24 and 20. This will reduce the pressure differential between chamber 17 and tubes 23 and 24 and will cause water which has entered tubes 23 and 24 from chamber 17 to return to chamber 17. As the water level rises in chamber 17 it covers gap 24c and separates the vapor phases of chamber 17 and tubes 23 and 24 to renew the cycle of operation. The changes in the water level in tube 23 cause, through buoyant forces, a corresponding change in the position of float 25. The up and down movement of float 25 is transmitted to force receiving rod 29. This is translated to useful work through conventional leakages to moving parts of a generator or a wheel of a machine or vehicle.

A novel feature of the invention in FIGS. 1–5 is the fact that seal control tube 24 is placed in a permanent slanted position. This is based upon the empirical observations that the efficiency of the transfer of vapor through tube 24 (when gap 24c is exposed to the vapor phase 17c) is inversely related to the angle of tube 24 with fluid phase 18a. Thus, when tube 24 forms a 90° angle with fluid level 18a the flow of vapor through tube 24 is sporadic and slow and greatly reduces the efficiency of the engine. In contrast, the transfer of vapor is increased and could be complete when tube 24 forms angles which are less than 90° with water level 18a. Seal control tubes which are vertical at their upper portion and slanted or horizontal at their lower portion can likewise be utilized and are within the scope of the present invention. Gaps at the lower portions of tube 24 such as gap 24c further increase the speed of the transfer of vapor through tube 24. It is understood that variation in the form of the gaps may be made within the scope of the invention.

While the invention has been described with reference to the embodiments in FIGS. 1–5, it will be readily understood that modifications of the invention may be made without departing from the essence of the invention as described in the claims.

What is claimed is:

1. A differential temperature engine comprising a relatively warm and a relatively cold chamber,
   a supply of evaporating liquid in said chambers to exert a vapor pressure in said chambers,
   a valve-substitute consisting of a tube at an angled disposition communicating at one end with the cold chamber,
   the other open end of the tube adapted to be immersed in the liquid in the warm chamber,
   said immersion adapted to be complete, when the operational level of the fluid is high, and to be incomplete when the operational level of the liquid is low,
   said complete immersion completing a separation between the vapor phases of the warm and cold chambers, and said incomplete immersion permitting a communication between the vapor phases of the warm and cold chambers,
   means for obtaining a temperature differential between the chambers,
   at least one moving member responding to vapor pressures,
   and means for translating said movement to useful work.

2. The invention as described in claim 1 and including at least one gap at the lower end of the "valve-substitute tube."

3. The invention as described in claim 1 and including a vertical tube immersed at one end in the liquid in the warm chamber and communicating at its other end with the cold chamber, said tube adapted to receive rising fluid responding to vapor pressure differentials between the chambers, to raise the liquid level in said tube and to lower the liquid level in the warm chamber.

4. The invention as described in claim 1 wherein the valve-substitute tube is adapted to receive rising liquid in response to vapor pressure and contains a float responding to changes in liquid level.

5. The invention as described in claim 1 wherein "at least one moving member" includes float means responding to changes in liquid levels.

6. The invention as described in claim 1 and including means for immersing one chamber in a body of water.

7. The invention as described in claim 1 and including means for submerging the cold chamber in a body of water situated at a lower level than the warm chamber, and pump means for returning condensate in cold chamber to the warm chamber.

8. The invention as described in claim 1 wherein said means for obtaining a temperature differential include a solar energy collector system to selectively heat the warm chamber.

9. The invention as described in claim 1 and including solar hot water systems to obtain a temperature differential between the chambers.

10. The invention as described in claim 1 wherein means for translating said movement to useful work include magnetic means to transmit movement from the inside to the outside of said chambers.

11. The invention as described in claim 1 wherein said means for obtaining a temperature differential includes cooling the cold chamber by surface evaporation of water.

12. The invention as described in claim 1 wherein said means for obtaining a temperature differential include a tray adapted to hold water and wick means adapted to transfer said water to the surfaces of the cold chamber by capillary action to selectively cool the cold chamber by surface evaporation.

13. A valveless steam engine consisting of a boiler,
a supply of evaporating water in said boiler to exert a vapor pressure in said boiler,
a valve-substitute consisting of a tube communicating at one open end with the space outside of the boiler,
the other open end of said tube adapted to be completely immersed in the water of the boiler when the operational water level is high and to be partially immersed in the water when the water level is operationally low,
said complete immersion completing a separation between the vapor phase of the boiler and outside air, and said partial immersion permitting a communication between the vapor phase of the boiler and outside air,
at least one moving member responding to vapor pressures,
means for translating said movement to useful work, 14. A valve-substitute consisting of a tube communicating at one open end with a relatively low-pressure vapor phase,
the other open end of said tube adapted to be completely immersed in a liquid under a relatively high pressure vapor phase when the liquid level is relatively high, and to be partially immersed in the fluid when fluid level is relatively low,
said complete immersion completing a separation between the high pressure and low pressure vapor phases, and said incomplete immersion permitting the passage of vapor from the high pressure vapor phase to the low pressure vapor phase.

* * * * *